L. R. ALDERMAN AND A. G. SMITH.
ANT TRAP.
APPLICATION FILED APR. 21, 1919.
1,314,112. Patented Aug. 26, 1919.
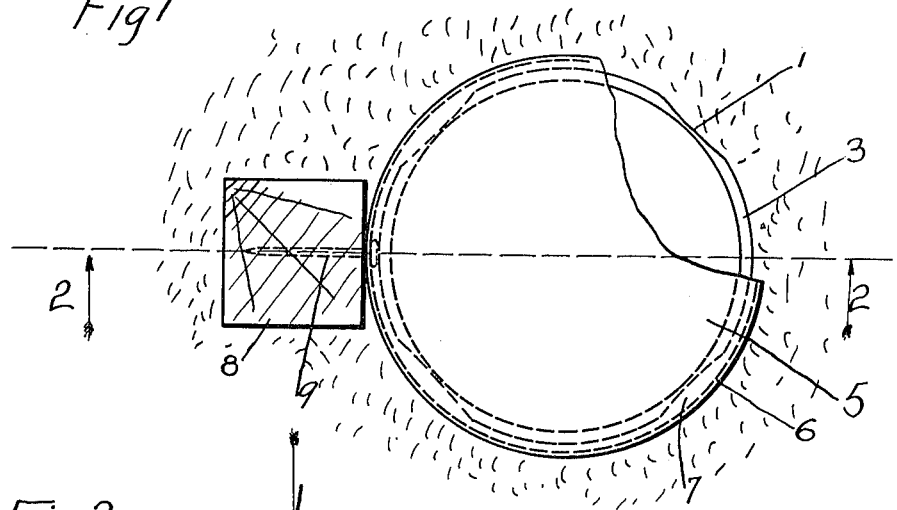
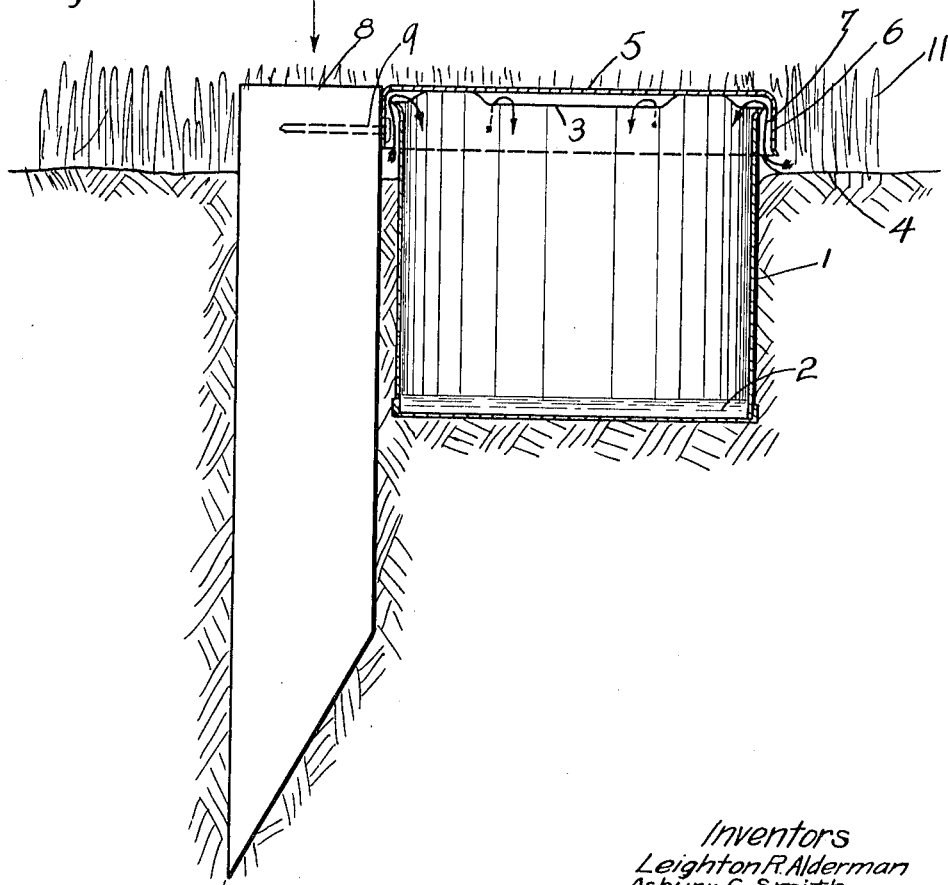
Inventors
Leighton R. Alderman
Asbury G. Smith
By Hazard & Miller
Attorneys

UNITED STATES PATENT OFFICE.

LEIGHTON R. ALDERMAN AND ASBURY G. SMITH, OF PASADENA, CALIFORNIA.

ANT-TRAP.

1,314,112. Specification of Letters Patent. Patented Aug. 26, 1919.

Application filed April 21, 1919. Serial No. 291,735.

*To all whom it may concern:*

Be it known that we, LEIGHTON R. ALDERMAN and ASBURY G. SMITH, citizens of the United States, residing at Pasadena, in the county of Los Angeles and State of California, have invented new and useful Improvements in Ant-Traps, of which the following is a specification.

Our object is to make an ant trap, and our invention consists of the novel features herein shown, described and claimed.

Figure 1 is a top plan view of an ant trap, embodying the principles of our invention, set in the ground ready for use, parts being broken away, and the view being taken looking in the direction indicated by the arrow 1 in Fig. 2.

Fig. 2 is a vertical diametrical sectional detail on the line 2—2 of Fig. 1.

The tin can 1 is provided with a suitable quantity of ant paste 2, the can being preferably a straight cylinder with a flat bottom. The upper edges of the can 1 are turned outwardly in places to make the inlet openings 3. The can is set in the ground at a spot frequented by the ants with the upper edge of the can slightly above the surface 4 of the ground. The cover 5 is a flat plate having a rim 6 somewhat larger than the can 1 so as to form the passage 7 upwardly outside of the can 1 inside of the rim 6 to the openings 3. The cover 5 is secured to a stake 8 by driving a nail 9 from the inside of the rim 6 into the stake, and the stake 8 is driven into the ground adjacent to the can 1 until the flat lower face of the top of the cover 5 fits upon the projections between the openings 3. The top of the stake 8 and the top of the cover 5 should be painted green to imitate the green verdure 11 surrounding the trap.

If the trap is set in a lawn or garden the garden may be sprinkled freely without any liability of the water passing into the can 1. The ants will pass from the ground upwardly through the passage 7 and through the openings 3 and downwardly to the ant paste 2, and after eating the paste the ants will die and remain in the can.

When desired the stake 8 may be pulled up and the can emptied, cleaned and rebaited with ant paste.

Various changes may be made without departing from the spirit of our invention as claimed.

We claim:

1. An ant trap comprising a can adapted to be set in the ground and baited with ant poison, said can comprising a bottom and a wall extending upwardly from the bottom; and a cover adapted to be loosely mounted to rest upon the can, said cover comprising a top and an annular wall extending from the edge of the top, the wall of the cover being spaced from the wall of the can; and there being notches in the upper edge of the can; so that there will be passages for ants to pass upwardly between the wall of the cover and the wall of the can and through the notches to the interior of the can.

2. An ant trap comprising a can adapted to be set in the ground and baited with ant poison, said can comprising a flat bottom and a cylindrical wall extending upwardly from the bottom; and a cover adapted to be loosely mounted to rest upon the can, said cover comprising a flat top and an annular wall extending from the edge of the flat top, the wall of the cover being spaced from the wall of the can; and there being notches in the upper edges of the can; so that there will be passages for ants to pass upwardly between the wall of the cover and the wall of the can and through the notches to the interior of the can; and a stake secured to the cover and adapted to be driven into the ground beside the can to hold the cover in place.

In testimony whereof we have signed our names to this specification.

LEIGHTON R. ALDERMAN.
ASBURY G. SMITH.